United States Patent [19]

Berecz et al.

[11] 4,172,314

[45] Oct. 30, 1979

[54] TOOL FOR INSTALLING THREAD INSERT

[75] Inventors: Imre Berecz, Dana Point; D. Richard Paul, Fullerton; Joseph P. Zupan, Whittier, all of Calif.

[73] Assignee: Microdot Inc., Greenwich, Conn.

[21] Appl. No.: 913,650

[22] Filed: Jun. 8, 1978

Related U.S. Application Data

[63] Continuation of Ser. No. 799,650, May 23, 1977, abandoned.

[51] Int. Cl.[2] .............................................. B23P 19/04

[52] U.S. Cl. .................................................. 29/240.5

[58] Field of Search ...................... 29/240.5; 81/57.37, 81/57.23, 57.11, 57.12, 57.13, 57.14, 54; 144/32 R

[56] References Cited

U.S. PATENT DOCUMENTS

| | | | |
|---|---|---|---|
| 2,453,840 | 11/1948 | Geertsema | 29/240.5 |
| 2,855,661 | 10/1958 | Forster | 29/240.5 |
| 3,052,972 | 9/1962 | Steinmeyer | 29/240.5 |
| 3,111,751 | 11/1963 | Eddy | 29/240.5 |
| 3,579,793 | 5/1971 | Williams et al. | 29/240.5 |
| 3,934,629 | 1/1976 | Boman | 144/32 R |

*Primary Examiner*—James L. Jones, Jr.
*Attorney, Agent, or Firm*—Harness, Dickey & Pierce

[57] ABSTRACT

Disclosed is a fixed carrier type coil insert tool for installing a threaded insert into a threaded aperture of a workpiece. The insert tool is designed to provide means for externally adjusting the depth to which the coil insert is installed within the workpiece. This is accomplished by providing a carrier whose position relative to the mandrel can be adjusted so that the distance from the end of the mandrel to the workpiece is adjustable. Since the mandrel advances a fixed distance upon actuation of the power tool, the result is a change in the depth of penetration of the mandrel into the workpiece, and a corresponding adjustment in the depth to which the coil insert is installed into the aperture of the workpiece.

1 Claim, 2 Drawing Figures

TOOL FOR INSTALLING THREAD INSERT

This is a continuation, of application Ser. No. 799,650, filed May 23, 1977, now abandoned.

BACKGROUND AND SUMMARY OF THE INVENTION

The present invention relates to helical coil insert power tools and in particular to an improvement in fixed carrier type power tools.

The invention pertains to a power tool for screwing a threaded insert into a threaded aperture of a workpiece. Hard material coil inserts are frequently utilized to provide a hard thread within a workpiece of soft material, such as aluminum. This practice is quite common, for example, in the aircraft industry where aluminum is used almost exclusively and high strength bonds are a necessity.

Various types of coil insert power tools are currently available. A first type includes a carrier that is adapted to retract from an advanced position as the mandrel is threadedly advanced in the opposite direction, causing insertion of the coil insert into the workpiece. Another type comprises a stationary "carrier" and a mandrel that is threadedly advanced relative to the fixed carrier. In the former type of power tool, adjustments in the depth of insertion of the coil insert are made by adjusting the position of a locking ring threadedly engaged with the carrier, which limits the retraction of the carrier and thereby limits the advancement of the mandrel. For an example of such a device, see U.S. Pat. No. 3,579,793, issued May 25, 1971, and assigned to the assignee of the present invention. With the fixed carrier type, however, the mandrel is the only moving element. Consequently, adjustments in the depth of insertion have heretofore been made by disassembling part of the tool and inserting shims within the interior of the tool to limit the advancement of the mandrel.

The present invention seeks to eliminate the necessity of having to dismantle a power tool of this type in order to make adjustments in its calibration. External adjustment means are provided in the power tool according to the present invention which, instead of directly limiting movement, adjusts the distance the mandrel must travel before reaching the workpiece. Accordingly, since the distance the mandrel advances is fixed, the effect is to vary the depth of penetration of the mandrel into the aperture of the workpiece.

The present invention, in general, comprises a power tool having a mandrel that is driven in rotation at one end by a motor and is threadedly engaged with a carrier fixedly secured to the body of the tool at its other end. When actuated by the motor, th threaded end of the mandrel advances longitudinally into a coil insert until a cam end thereof engages a tang at the end of the coil insert causing the insert to thereafter rotate with the mandrel. A threaded extension of the carrier abutting the workpiece reduces the diameter of the coil insert as it is screwed into the threaded aperture of the workpiece by continued advancement of the mandrel. Adjustments in the depth of insertion of the coil insert are made by adjusting the position of the carrier relative to the body of the tool. The position of the carrier is secured by a locking nut disposed between the carrier and the body of the tool which is tightened against the body once the desired carrier position is selected. Thus, since the end of the carrier abuts the surface of the workpiece, it can be seen that changes in the relative position of the carrier alters the depth of penetration of the mandrel into the aperture of the workpiece.

Additional objects and advantages of the present invention will become apparent from a reading of the following detailed description of the preferred embodiment which makes reference to the following set of drawings of which:

DETAILED DESCRIPTION OF THE PREFERRED EMBODIMENT

Figure 1:
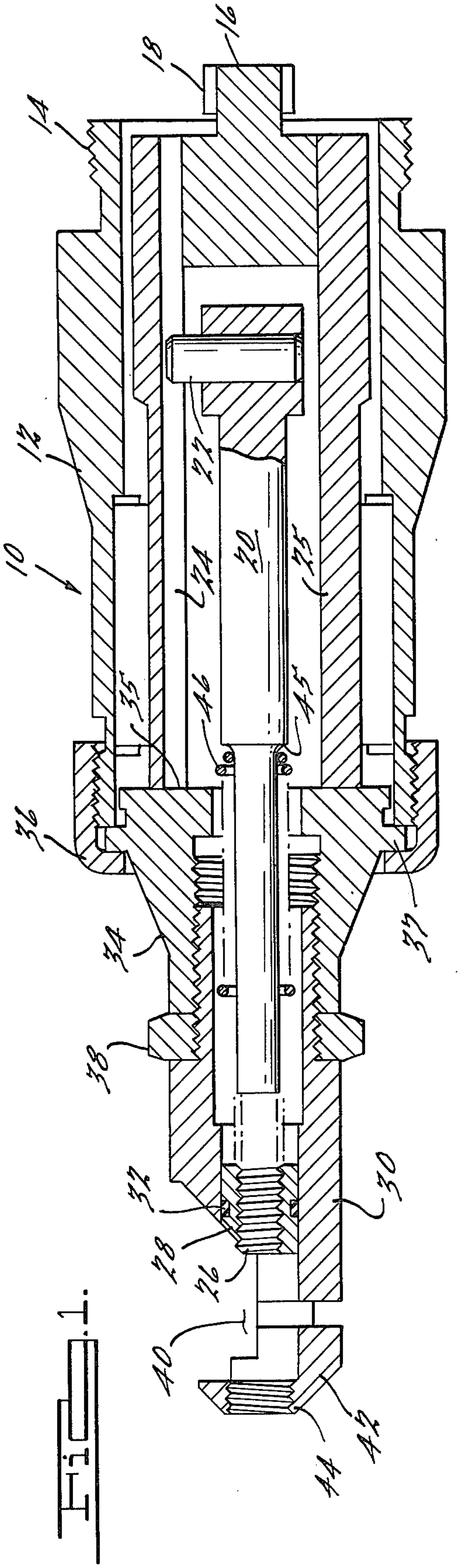
FIG. 1 is a sectional view of the power tool according to the present invention.

Referring to FIG. 1, the power tool according to the present invention comprises a body 12 that is adapted to be threadedly fastened at 14 to the housing of an electric air motor (not shown). An exposed shaft 16 having splines 18 is adapted to engage the drive of the motor. The rotation of shaft 16 turns drive member 25 which in turn rotates mandrel 20 via engagement with a drive pin 22 that is secured to mandrel 20 and is adapted to ride within the longitudinal slot 24 formed in drive member 25. The opposite end of the mandrel 20 is threaded at 26 complementary to a sleeve insert 28 that is secured to the carrier 30 in a manner to be subsequently described. Carrier 30 is threadedly fastened to a neckpiece 34 that is in turn secured to the body 12 of the tool via a collar 36 which clamps the flange 37 of the neckpiece 34 against the body 12 when screwed onto the body 12 as shown. A spring 46 is disposed about the mandrel 20 and is adapted to be compressed between the shoulder 45 of the mandrel 20 and the sleeve insert 28 as the mandrel 20 is advanced longitudinally upon rotation by the motor. The advancement of the mandrel 20 causes the helical coil insert (not shown) placed in the recess 40 of the carrier 30 to screw over the threaded end 28 of the mandrel 20, until a cam surface at the end of the mandrel 20 engages the tang at the end of the coil insert. Thereafter, the coil insert will rotate with the rotation of the mandrel 20. The reduced diameter of the end coil of the insert permits the threaded end 26 of the mandrel 20 to pass into the insert and have the cam of the end of the mandrel 20 engage the tang of the coil insert.

As the coil insert is rotated by the mandrel 20, it is forced into the threaded bore 44 in the carrier extension 42 where it is contracted due to the reduced diameter of the threaded bore 44. Continued advancement of the mandrel 20 causes the coil insert to pass from the extension 42 into the threaded aperture in the workpiece (not shown). The motor will continue to advance the mandrel 20 until the drive pin 22 contacts the end surface 35 of the neckpiece 34, causing the air motor to stall. The threaded end 26 of the mandrel 20 is then drawn out of the aperture in the workpiece, leaving the coil insert in the workpiece, by rotating the mandrel 20 in the opposite direction. For a more detailed description of the manner in which the coil insert is installed in the aperture of a workpiece, see the description contained in U.S. Pat. No. 3,579,793, issued May 25, 1971, and assigned to the assignee of the present invention, which description is incorporated herein by reference.

As is readily apparent to those skilled in the art, the threads of the sleeve insert 28 must be properly aligned relative to the threads in the bore 44 of the carrier extension 42 so that the turns of the coil insert will extend into the roots of the threads in bore 44 when mandrel 20 is still threadedly engaged with the sleeve insert 28. To obtain the proper alignment of the crown and roots of the threads, a coil insert is initially threaded into bore 44 by advancing mandrel 20 as described, and then the sleeve insert 28 is brazed or otherwise secured to the carrier 30 to retain the established relationship between the threads.

The depth to which the coil insert will be installed in the aperture of the workpiece is of course dependent upon the distance the mandrel 20 is advanced beyond the end of the carrier extension 42. With previous coil insert tools of this type, adjustments in the depth of insertion were made by disassembling the neckpiece 34 and carrier 30 from the body 12 of the tool and inserting shims or spacers around the mandrel 20. In this manner, the distance that the threaded end 26 of the mandrel 20 was permitted to advance beyond the extension 42 before the drive pin 22 stalled the motor could be varied. However, the necessity of having to dismantle parts of the tool to make an interior adjustment was a disadvantage.

The power tool 10 according to the present invention is adapted to obviate the necessity of disassembling parts of the tool in order to adjust the depth of penetration. In particular, rather than changing the limit of travel of the mandrel 20, the present invention employs adjustment means for varying the distance the mandrel 20 must advance before it reaches the workpiece. Specifically, the carrier 30 of the present tool 10 is adapted to be moveable relative to the neckpiece 34 so that the distance from the threaded end 26 of the mandrel 20 to the workpiece is made variable. The lock nut 38 is provided to secure the carrier 30 in the position selected.

Figure 2:
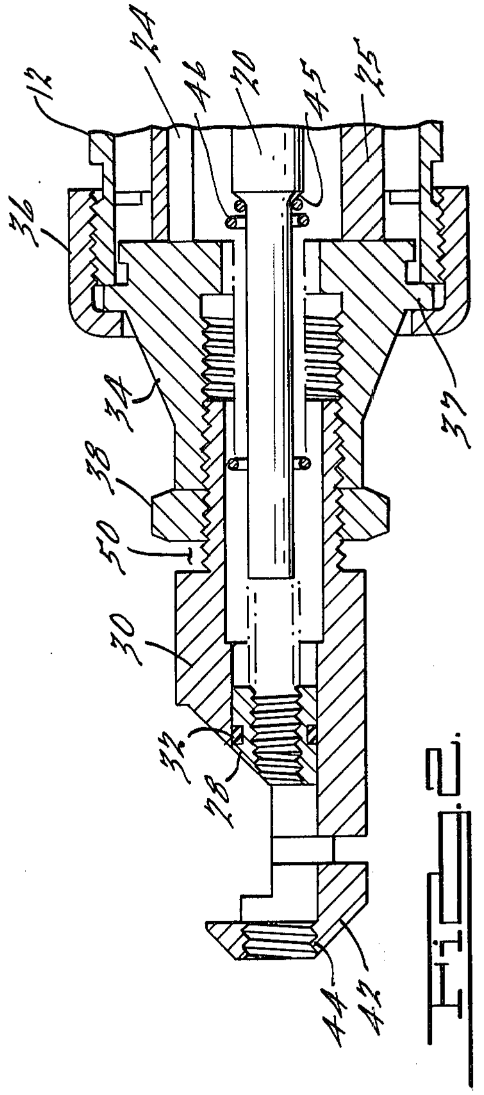
FIG. 2 is a partial sectional view of the power tool illustrated in FIG. 1 showing an adjustment in the calibration of the tool.

For example, if it is desired to decrease the depth of penetration from the position provided in FIG. 1, the carrier 30 is merely unscrewed from the neckpiece 34 the required distance and the locking nut 38 tightened against the neckpiece 34, as illustrated in FIG. 2. Thus, a gap 50 is created between the carrier 30 and the lock nut 38 as shown, that is equivalent to the amount by which the depth of penetration is reduced relative to the FIG. 1 position. It will be appreciated that the maximum amount of penetration is provided by positioning the carrier 30 against the lock nut 38, as illustrated in FIG. 1. Depth of installation of the coil insert is reduced as the carrier 30 is withdrawn from the neckpiece 34. Thus, it can be seen that a fixed carrier type coil insert tool is disclosed that provides external means of calibrating the tool, thereby eliminating the need for shims and other adjusting means that require the dismantling of the tool to install.

While the above description constitutes the preferred embodiment of the invention, it will be appreciated that the invention is susceptible to modification, variation and change without departing from the proper scope or fair meaning of the accompanying claims.

What is claim is:

1. An externally adjustable tool for advancing a thread insert to a predetermined depth in a complimentary threaded aperture in a workpiece, said tool comprising a tubular body having a central longitudinal axis, an insert carrier having a threaded portion engaged in a complimentary threaded bore in said body and movable relative thereto along the central axis thereof, a locking nut in threaded engagement with the threaded portion of said carrier and adapted to be tightened against said body to rigidly secure said carrier relative thereto, and a mandrel within said body and carrier and threadably engaged at one end with said carrier for rotation about and movement along the central axis of said body and carrier, the other end of said mandrel adapted to be driven in rotation by motive means connectable to said body, said mandrel being advanceable a fixed distance relative to said body and a selectable distance relative to said carrier upon actuation of said motive means, said mandrel first engaging an insert in said carrier and thereafter engaging a stop on said body to stall said motive means, the extent of advancement of said mandrel relative to said carrier and workpiece being a function the position of said carrier relative to said body whereby said body and carrier can be rigidly biased against the workpiece and said insert is advanced a predetermined distance into the aperture in said workpiece upon advancement of said mandrel without relative movement between any portion of said body or carrier and said workpiece.

* * * * *